Figure 1:
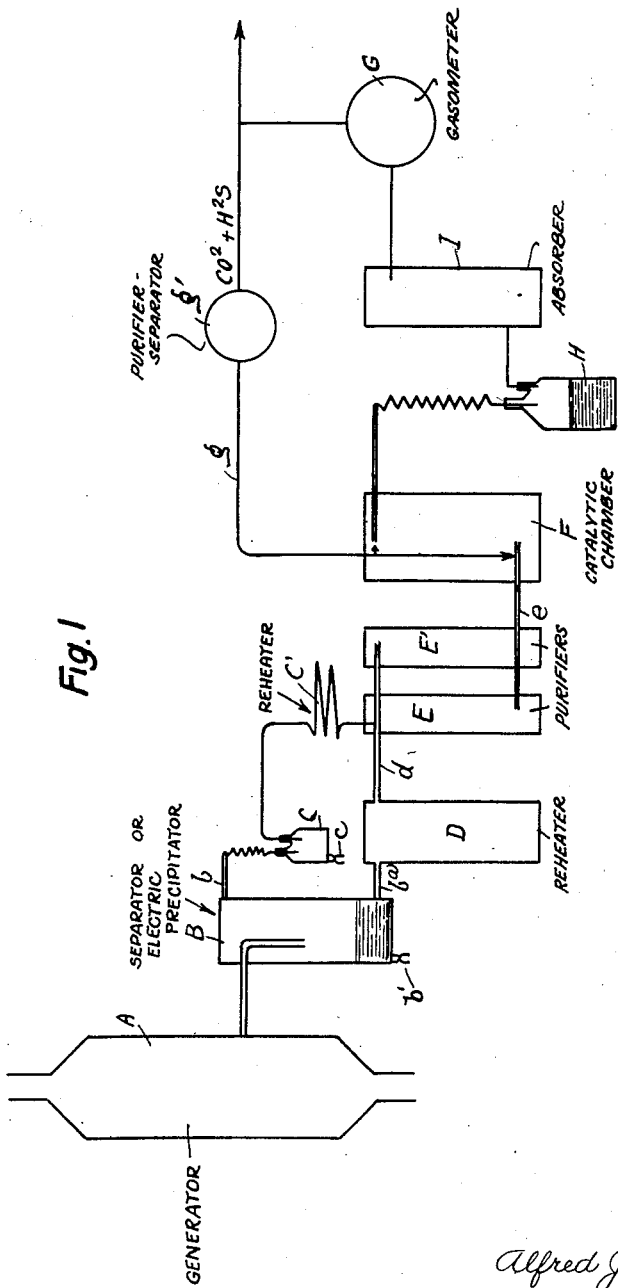

Patented Sept. 27, 1932

1,879,750

UNITED STATES PATENT OFFICE

ALFRED JOSEPH, OF ENGHEIN, FRANCE, ASSIGNOR, BY MESNE ASSIGNMENTS, TO HOUDRY PROCESS CORPORATION, OF DOVER, DELAWARE, A CORPORATION OF DELAWARE

PROCESS FOR THE CONVERSION OF SOLID COMBUSTIBLES INTO LIQUID FUEL

Application filed April 29, 1929, Serial No. 359,146, and in France May 8, 1928.

Hitherto in treating solid combustibles (coal, lignite, shale, and the like) with a view to the conversion thereof by low temperature distillation and subsequent catalytic treatment, into synthetic liquid fuel, care is taken to leave either in the solid combustible before subjecting it to distillation, or in the gases and vapours derived from the distillation, an important quantity of water or steam respectively intended to serve as a carrier for the tar vapours and suitably to reduce the vapour tension of these latter.

If in known processes a pre-desiccation of the solid combustibles may have been effected, the influence which a more or less large quantity of steam left in the mixture can have has not been considered, and particularly the relation between the proportion of steam and the proportion of tar vapours and gases emanating from the starting material. The sole consideration which has been had in view for the partial elimination of water in suspension in the starting material has been the necessity of suppressing such water for the effective operation of the kiln or other distillation apparatus.

The presence of a certain quantity of steam in the mixture which is about to be subjected to a catalytic treatment for its enrichment with hydrogen, is justified for the reason that it is convenient for reducing the temperature of the catalytic treatment to below the dew point of the condensible vapours, in order to promote in the fullest measure the catalytic reaction. This reduction is produced precisely by virtue of the dilution of the gases and vapours in a suitable quantity of steam.

On the other hand, too large a dilution of the useful gases and vapours with steam presents the inconvenience of necessitating an increase in the capacity of the purifying and reaction chambers, with a view to ensuring for the mixture to be hydrogenated, a sufficient duration of contact with the purifying masses and the catalytic agents.

It should be added that an excessive dilution with steam of the gaseous masses to be hydrogenated tends to paralyze the catalytic reactions. Finally, the increase of temperature to be communicated to the mass of steam in order to bring it to the reaction temperature, represents a considerable expenditure of heat. These considerations emphasize the importance not hitherto stated of reducing to an absolute minimum the quantity of steam serving as a carrier for the mixture of gas and vapour to be enriched by hydrogen.

The experience and researches of the applicant have enabled him to establish that the proportion of steam to be maintained in the mass of gases and vapours to be treated corresponds substantially to the vapour derived from the water of combination of the starting material. This proportion is far less than the proportion which pre-drying operations hitherto effected retained in the masses of gases and vapours usually treated.

The invention consists, in principle, in eliminating from the starting material the water which it contains in mechanical suspension (the hygroscopic water), in a manner practically to conserve in such material only the water chemically combined therewith the water of combination.

According to the invention, this practically total elimination of the water which the starting material contains in suspension, can be effected either by a pre-desiccation carried sufficiently far of the solid combustible before the introduction of the latter in the gas generating apparatus, or by a suitable treatment of the gases on issue from the generating apparatus before their admission into the purifying apparatus which precedes the catalytic reaction chambers.

In the case where in order to leave the solid combustible only its water of combination, its pre-desiccation is effected, it suffices to know exactly the nature of the solid combustible treated by determining its humidity and its content of water of combination.

If on the contrary it is desired to proceed with the separation of the water by acting on the mixture of gases and vapours on leaving the generating apparatus (kiln, retort or the like) one of the methods and one of the apparatus hereinafter described will be employed:

In accordance with the first apparatus embodying the invention to be described with the aid of the diagram of Fig. 1 of the annexed drawings, solid hydrocarbon combustible starting material, such as coal, lignite, shale and the like, is subjected to distillation at low temperatures, not exceeding approximately 500° C., in a gas generating apparatus A, and produces a mixture of gases and vapours including water vapours, complex hydrocarbon vapours which when condensed give what are known as primary tars, and permanent gases such as $CO, CO_2, H, N, CH_4$, and the like. The mixture of gases and vapours issuing from the generating apparatus A is, before its admission into the purifying apparatus which precede the catalytic chambers, admitted into a separator or electric precipitator B, wherein by the known means of the action of high frequency electric currents, for example, there is condensed in the lower portion almost the whole of the tar vapours and a quantity of water the proportion of which is substantially equal to or not appreciably less than the water of combination of the starting material. At the upper portion of the separator B, which is heated to a temperature of about 90 to 100° C., escape, by the pipe $b$, the non-condensed gases and the whole of the water vapour corresponding to the water which the starting material contained in suspension as well as an inconsiderable portion of the water vapour corresponding to the water of combination. There also escapes a slight quantity of tar oil which, together with the water vapor, is collected, by condensation, in a receiver C which may be maintained merely at ordinary air temperature. The light tar oil is siphoned away for further treatment, while the condensed water of suspension is withdrawn and eliminated from the system from time to time through a valved drain $c$.

From the tar and water condensed in the lower portion of separator B, there is eliminated also either at the end of the run or from time to time, as desired, a predetermined quantity of water which may be withdrawn through a valved outlet $b'$. The precipitated tars, together with the water in excess of the eliminated quantity, pass from separator B by a pipe $b^2$ into a reheater D operating at a suitable temperature to effect complete vaporization of the tars and accompanying water. This temperature will generally vary between 350 to 400° C. The vapours issuing from the reheater D are then led, by $d$, into a purifier E—$E^1$, maintained like the communicating pipes, at a temperature in the neighborhood of that of D, and wherein the impurities, such as sulphur, are removed. Into this purifier, are admitted at the same time the gases derived from the vessel C, after having been suitably reheated with the aid of the coil $C^1$ to a temperature substantially equal to that of the vapours issuing from reheater D, the apparatus group D–$C^1$ and the purifiers E—$E^1$ being for instance located in one and the same massive brick structure wherein hot gases circulate. The purified mixture is then, in the known manner, led, by a pipe $e$, into the catalytic reaction chambers F, wherein is effected the enrichment with hydrogen, by the aid of hydrogenating gases, of the unsaturated hydrocarbons produced in generator A, the hydrogenating treatment taking place at or near atmospheric pressure and in the presence of a suitable catalyst. The hydrogenating gases may be constituted wholly or in part by the residual gases supplied by a pipe $g$ and issuing from a purifier-separator $g^1$ connected to the outlet from a gasometer G. The purifying material used in purifiers E—$E^1$ can be of any known type such as a ceramic supporting material, clay or the like, which is charged with a metal or a metallic oxide, oxide of nickel, for example. The catalytic agent used in reaction chambers F may be an activated silicate of alumina together with a metal or metallic oxide, such as nickel.

The mixture of gases and vapours, on leaving the catalytic treatment apparatus F, is, in the known manner, conducted into a receiver H wherein the condensible vapours are collected, the non-condensible gases being led into an apparatus I for the absorption of the light constituents, charged with activated carbon or any other suitable absorbent material, and thence to gasometer G. The condensate collected in receiver H may then be suitably stored for use as synthetic liquid fuel.

Figure 2:
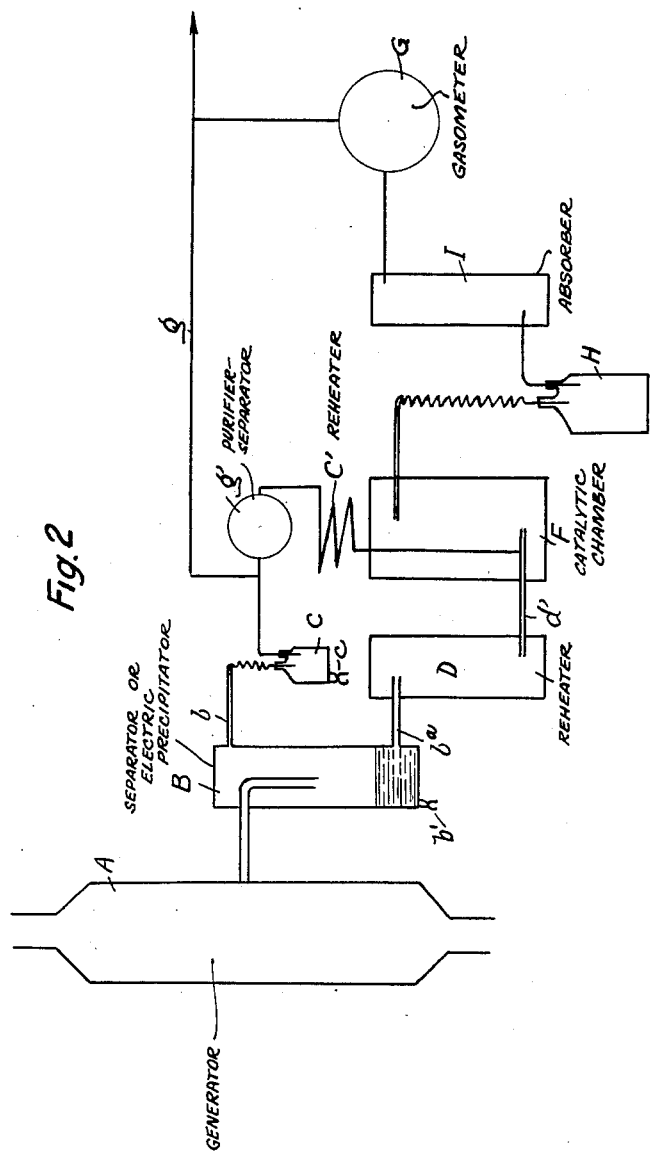

In the modification illustrated diagrammatically by Fig. 2 of the drawings, the tar vapours charged with a quantity of steam which they have retained, are led directly, on leaving the reheater D, by a pipe $d^1$, into the catalytic reaction chambers F, into which moreover pass the gases derived from the receiver C, after passage through a purifier separator $g^1$ and reheating in a coil $C^1$.

This modification which comprises the separated purification of the gases unmixed with the tar vapours, is preferably to be employed in the case when the gases have a slight content of sulphuretted hydrogen. The said modification enables another mode of recuperating the sulphur and is to be employed when, instead of collecting the sulphur in the form of sulphurous anhydride, it is desired to collect it in the form of colloidal sulphur.

I claim:

1. A process for the production of synthetic liquid fuels from solid pyrobituminous starting materials containing water both in suspension and in combination, which consists in subjecting the starting materials to a low temperature destructive distillation to produce volatilized tars, gases and water vapours, separating and precipitating the tars and the water vapours derived from the water of combination from the gases and the water vapours derived from the water of suspension, condensing and eliminating said water of suspension, revapourizing the tars and the water of combination and recombining them with the uncondensed gases, and subjecting the recombined products to a catalytic hydrogenating treatment.

2. A process for the production of synthetic liquid fuels from solid pyrobituminous starting materials which comprises subjecting the starting materials to a low temperature distillation wherein vaporized products including volatilized tars, gases and water vapors are obtained, separating the heavier tar vapors and a portion of the water vapors derived from water contained in combination in the starting materials from the remainder of said vaporized products, removing and eliminating from further treatment water vapors at least equal to those of the water of suspension of the starting materials so as to retain only the water of combination, revapourizing said water of combination and recombining said vaporized products except the removed water vapors, then subjecting the recombined vaporized product to a catalytic hydrogenating treatment, and condensing the hydrogenated product.

3. A process for the production of synthetic liquid fuels from solid pyrobituminous starting materials which comprises separating the heavier tar vapors and a portion of the water vapors derived from the water contained in combination in the starting materials from the remainder of said vaporized products, eliminating from said remaining vaporized products the water vapors therein comprising the water of suspension in the starting materials so as to retain only the water of combination, revapourizing said water of combination, combining it with the remaining vaporized products, purifying said combined products by the removal of sulphur compounds therefrom, and then subjecting the combined products to hydrogenation.

4. Process for the production of synthetic liquid fuels from solid pyrobituminous starting materials containing water both in suspension and in combination which comprises subjecting the starting material to a low temperature destructive distillation to produce volatilized tars, gases and water vapours, separating out all but a small amount of the water vapours derived both from the water of suspension and of combination by precipitation or condensation along with the tars from the gases and lighter vapours, eliminating a portion of the water, revapourizing the tars together with the remaining water condensate equivalent to the amount of water of combination, recombining the revapourized tars and water vapours with the lighter vapours and uncondensed gases, purifying the recombined products for the removal of sulphur compounds, and subjecting the purified recombined products to a catalytic hydrogenating treatment.

In testimony whereof I have signed this specification.

ALFRED JOSEPH.